(12) United States Patent
Yoon et al.

(10) Patent No.: US 7,437,989 B2
(45) Date of Patent: Oct. 21, 2008

(54) CONNECTING ROD FOR HERMETIC COMPRESSOR

(75) Inventors: Seung-Jae Yoon, Gimhae-si (KR); Won-Il Cho, Busan (KR); Dal Soo Kang, Changwon-si (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 11/391,293

(22) Filed: Mar. 29, 2006

(65) Prior Publication Data

US 2007/0227349 A1  Oct. 4, 2007

(51) Int. Cl.
  *F04B 39/00* (2006.01)
  *F16C 7/00* (2006.01)
(52) U.S. Cl. .......................... 92/128; 92/187
(58) Field of Classification Search ............... 92/72, 92/74, 76, 128, 140, 187; 29/888.09; 74/579 R
  See application file for complete search history.

(56) References Cited

U.S. PATENT DOCUMENTS

| | | | | |
|---|---|---|---|---|
| 4,407,168 A * | 10/1983 | Andrione et al. | ......... | 74/579 E |
| 4,567,815 A * | 2/1986 | Kocher | ......... | 92/261 |
| 4,856,366 A * | 8/1989 | Nikolaus | ......... | 74/579 E |
| 5,799,565 A * | 9/1998 | Bo | ......... | 92/128 |
| 6,609,299 B2 * | 8/2003 | Adachi | ......... | 29/888.09 |
| 6,739,237 B2 * | 5/2004 | Seo | ......... | 92/128 |
| 2002/0021850 A1 * | 2/2002 | Bertachini | ......... | 384/276 |
| 2003/0075007 A1 * | 4/2003 | Seo | ......... | 74/587 |

FOREIGN PATENT DOCUMENTS

| | | |
|---|---|---|
| JP | SH62-45384 | 3/1987 |
| JP | 2001-304111 | 10/2001 |
| JP | 2003-120533 | 4/2003 |

* cited by examiner

*Primary Examiner*—Thomas E Lazo
(74) *Attorney, Agent, or Firm*—Ked & Associates, LLP

(57) ABSTRACT

A connecting rod for a hermetic compressor is provided. The connecting rod includes a piston connecting portion, a body having an end connected to the piston connecting portion, a crankshaft connecting portion connected to a different end of the body and extending a predetermined length so that a curved surface is formed, an inner peripheral surface of the crankshaft connecting portion making surface contact with an outer peripheral surface of a sleeve fitted to an off-center pin of a crankshaft, and a clamp fastened to both ends of the crankshaft connecting portion and exerting elastic force to retain the sleeve on the inner peripheral surface of the crankshaft connecting portion. The sleeve does not deform, even when retained on the crankshaft connecting portion, and makes uniform surface contact with the off-center pin, which is inserted into the sleeve. This substantially reduces the abrasion of the sleeve and the off-center pin and improves the compressor's efficiency.

10 Claims, 6 Drawing Sheets

CONNECTING ROD FOR HERMETIC COMPRESSOR

BACKGROUND OF THE INVENTION

1. Field of the Invention

The present invention relates to a hermetic compressor, and more particularly to a connecting rod for a hermetic compressor capable of converting the rotation of a crankshaft into the reciprocating linear motion of a piston.

2. Description of the Prior Art

FIG. 1 is a sectional view showing the internal construction of a hermetic compressor according to the prior art. Referring to the drawing, a frame 2 is positioned inside a hermetic container 1, which includes upper and lower containers 1t and 1b. A stator 3 is fixed to the frame 2, which is supported inside the hermetic container 1 by a spring 2s. A crankshaft 5 is positioned so as to extend through the center of the frame 2. A rotator 4 is integrally formed on the crankshaft 5 and is rotated together with it by electromagnetic interaction with the stator 3.

The crankshaft 5 has an off-center pin 5b positioned on the upper end thereof while being offset from the rotational center of the crankshaft 5 and a balance shaft 5c positioned opposite the off-center pin 5b. The crankshaft 5 is rotatably supported on the frame 2. A crankshaft connecting portion 9c of the connecting rod 9 is fitted to the outer peripheral edge of the off-center pin 5b so as to rotate relative to the edge while a sleeve 8 is press-fitted and interposed.

The crankshaft 5 has an oil passage 5a formed therein, through which oil L is guided from the bottom of the hermetic container 1 to the top of the frame 2 to be scattered, and a pumping mechanism 5d positioned on the lower end of the crankshaft 5, in order to pump the oil L into the oil passage 5a.

The frame 2 is provided with a cylinder 6, which has a compression chamber formed therein. The compression chamber contains a piston 7, to which the piston connecting portion 9a of the connecting rod 9 connects. The cylinder 6 has a valve assembly 10 positioned on the upper end thereof, in order to control the flow of a refrigerant into/out of the compression chamber. A head cover 11 is mounted on the valve assembly 10, and an intake muffler 12 is positioned on the head cover 11 while connecting to the valve assembly 10, in order to transmit the refrigerant to the compression chamber.

In the drawing, reference numeral 7a refers to a pin fitted to the inner peripheral edge of the piston connecting portion 9a so as to fasten it to the piston 7, and 9b refers to the body of the connecting rod 9.

The construction of the connecting rod 9 is shown in FIG. 2 in more detail. The sleeve 8 is press-fitted to the inner peripheral surface of the crankshaft connecting portion 9c. The inner diameter of the sleeve 8 is determined in such a manner that it can rotate relative to the off-center pin 5b.

However, the conventional hermetic compressor has the following problems.

As shown in FIG. 2, the sleeve 8, which is press-fitted to the crankshaft connecting portion 9c, deforms due to the limited space of the inner peripheral edge of the crankshaft connecting portion 9c. Particularly, the inner peripheral surface of the sleeve 8 deforms, i.e. protrudes irregularly, and varies the inner diameter.

More specifically, part A of the sleeve 8 is enlarged and shown in a separate graph in FIG. 2 with a scale of 1 micron. In the graph, the straight solid line indicates enlarged part A of the sleeve 8, before being press-fitted, and the wavy solid line indicates enlarged part A of the sleeve 8, after being press-fitted. It is clear from the graph that the wavy solid line has a maximum distance of about 6 micron from the straight solid line. This implies that the entire inner diameter of the sleeve 8, including part A, has similar deformation.

If the inner diameter of the sleeve 8 deforms as shown in FIG. 2, the sleeve 8 inevitably makes linear contact with the off-center pin 5b, which is inserted therein. As a result, a vanishing phenomenon occurs on a surface treatment layer of the inner peripheral edge of the off-center pin 5b, and the frictional force between the sleeve 8 and the off-center pin 5b increases. This degrades the efficiency of power transmission from the crankshaft to the connecting rod 9.

SUMMARY OF THE INVENTION

Accordingly, the present invention has been made to solve the above-mentioned problems occurring in the prior art, and an object of the present invention is to provide a connecting rod for a hermetic compressor capable of minimizing the change of inner diameter of a sleeve which is press-fitted to a crankshaft connecting portion.

In order to accomplish this object, there is provided a connecting rod for a hermetic compressor including a piston connecting portion; a body having an end connected to the piston connecting portion; a crankshaft connecting portion connected to a different end of the body and extending a predetermined length so that a curved surface is formed, an inner peripheral surface of the crankshaft connecting portion making surface contact with an outer peripheral surface of a sleeve fitted to an off-center pin of a crankshaft; and a clamp fastened to both ends of the crankshaft connecting portion and exerting elastic force for retaining the sleeve on the inner peripheral surface of the crankshaft connecting portion.

In accordance with another aspect of the present invention, there is provided a connecting rod for a hermetic compressor including a piston connecting portion; a body having an end connected to the piston connecting portion; and a crankshaft connecting portion connected to a different end of the body, a sleeve being press-fitted to an inner peripheral edge of the crankshaft connecting portion so that the crankshaft connecting portion makes surface contact with an off-center pin of a crankshaft and rotates together with the sleeve while the sleeve is interposed, a groove being formed on the crankshaft connecting portion so that deformation of the sleeve is concentrated in a predetermined position and change of inner diameter of the sleeve resulting from press-fitting is prevented.

The connecting rod for a hermetic compressor according to the present invention is advantageous in that the sleeve makes uniform surface contact with the off-center pin, which is inserted therein. This prevents the inner peripheral edge of the off-center pin from wearing down. In addition, reduced fraction increases the efficiency of power transmission from the crankshaft to the connecting rod.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
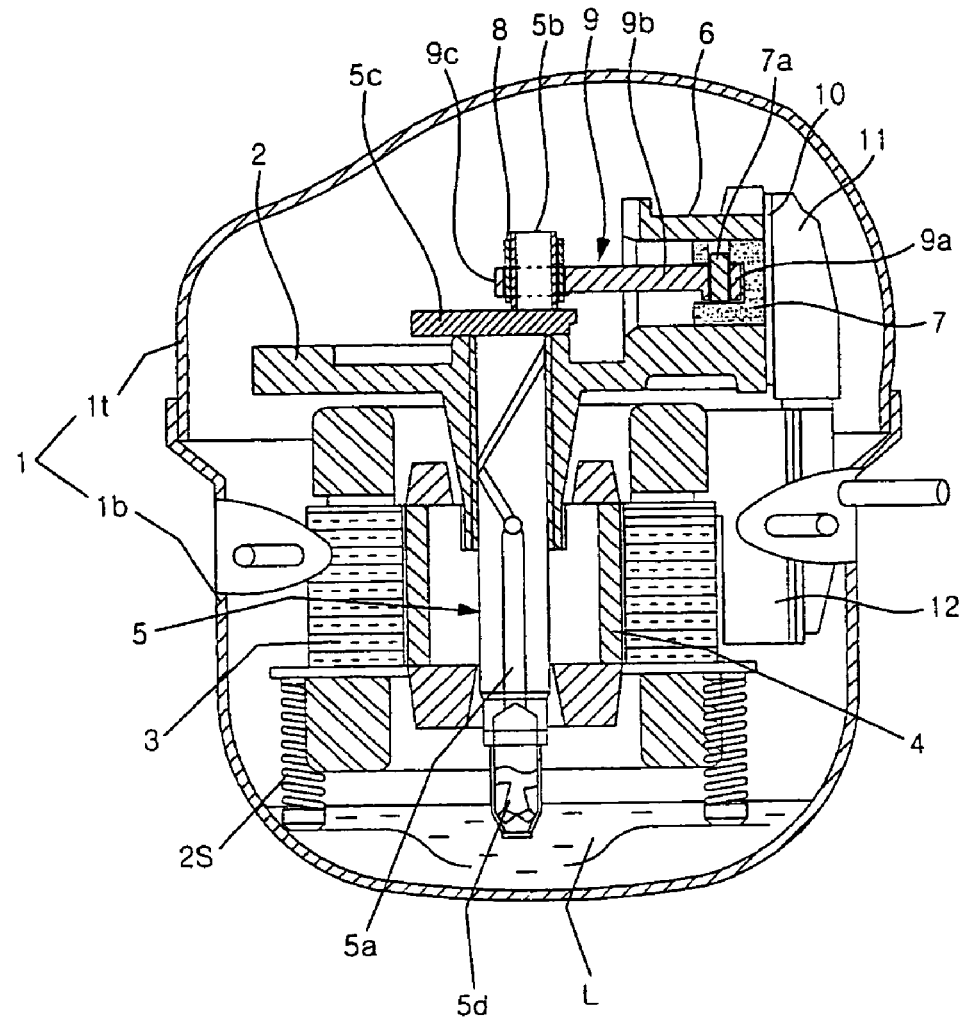
FIG. 1 is a sectional view showing the internal construction of a hermetic compressor equipped with a connecting rod according to the prior art.
Figure 2:
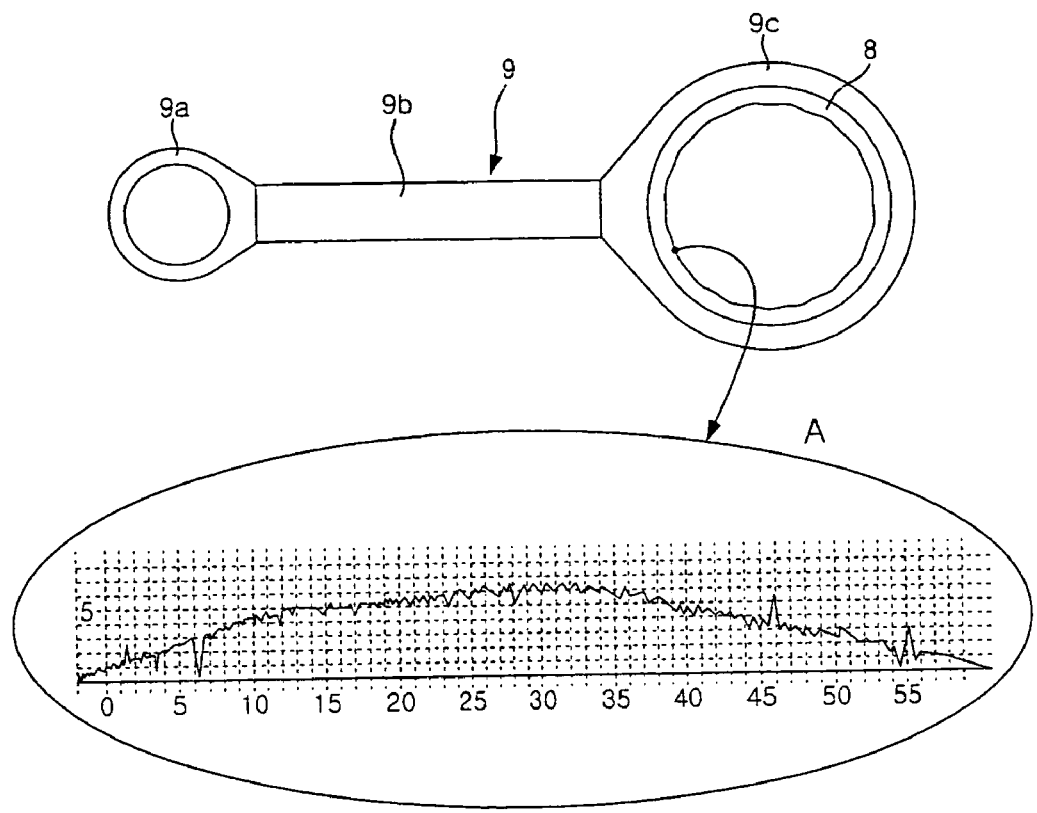
FIG. 2 is a top view showing a sleeve press-fitted to a crankshaft connecting portion in a connecting rod according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
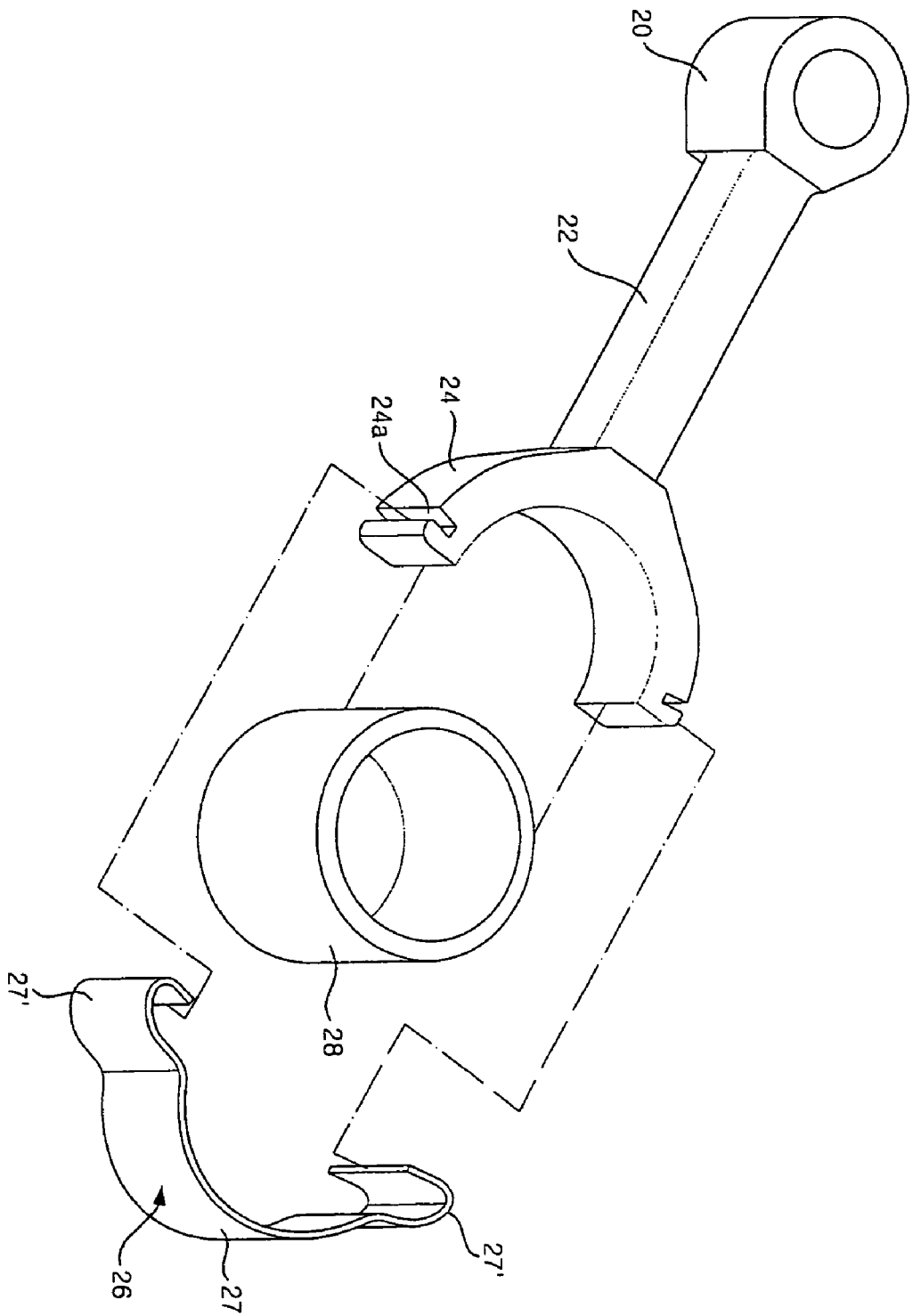
FIG. 3 is an exploded perspective view showing a connecting rod and a sleeve according to a preferred embodiment of the present invention.
Figure 4:
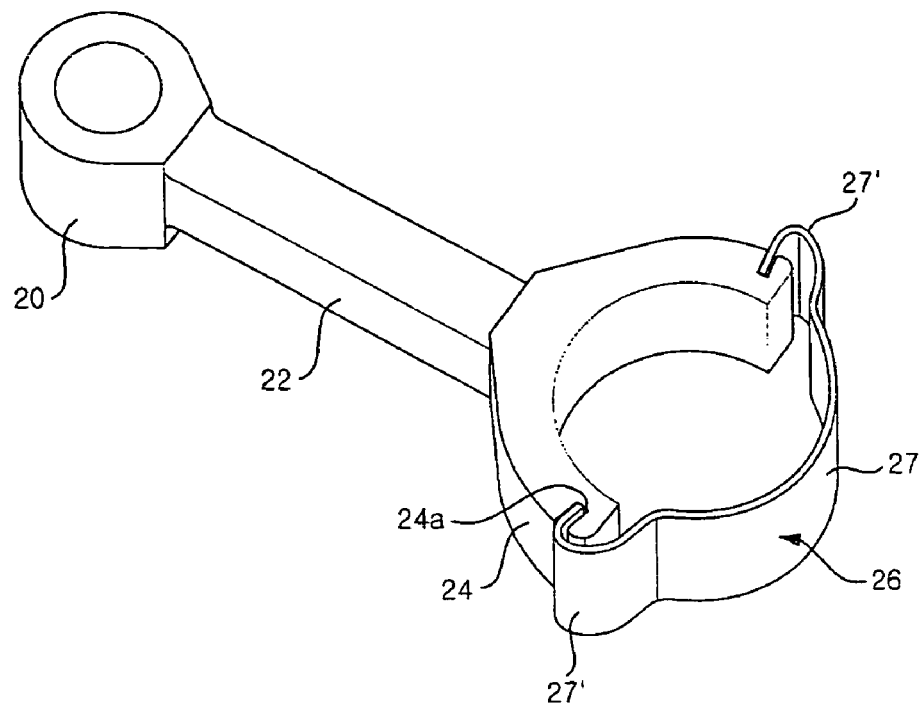
FIG. 4 is a perspective view showing a connecting rod according to an embodiment of the present invention.

FIG. 3 is an exploded perspective view showing a connecting rod and a sleeve according to a preferred embodiment of the present invention, and FIG. 4 is a perspective view of the connecting rod.

As shown in these drawings, the connecting rod according to the present embodiment has a piston connecting portion 20 positioned on an end thereof. The piston connecting portion 20 connects to a chamber, which is formed inside a piston 7, via a piston pin 7a. The piston connecting portion 20 is adapted to rotate inside the chamber of the piston 7 in a predetermined angular range relative to the piston 7a so that the piston 7 can reciprocate linearly inside a compression chamber of a cylinder 6.

It can be easily understood by those skilled in the art that, although the piston connecting portion 20 according to the present embodiment has a ring shape as shown in the drawings, it may have a spherical shape, for example, and connect to the piston 7 in a ball-joint mode.

An end of a body 22 connects to the piston connecting portion 20. The body 22 connects the piston connecting portion 20 to a crankshaft connecting portion 24 (described later). Although the body 22 has a bar shape with a square section, it may have a rod shape, for example.

The crankshaft connecting portion 24 is positioned on the other end of body 22. The crankshaft connecting portion 24 extends a predetermined distance from a point of connection to the body 22 in opposite directions, respectively, and forms a curved surface. The curved surface formed on the inner peripheral edge of the crankshaft connecting portion 24 corresponds to a curved surface formed on the outer peripheral edge of a sleeve 28, which is fitted to an off-center pin 5b of a crankshaft 5. In other words, the crankshaft connecting portion 24 has a curved surface formed on its inner peripheral surface so as to make surface contact with the outer peripheral edge of the sleeve 28.

It is to be noted that the crankshaft connecting portion 24 does not enclose the entire outer peripheral edge of the sleeve 28 in a ring shape, but it spans approximately half the outer peripheral surface of the sleeve 28. This means that, when viewed from above, the crankshaft 24 has a semi-circular shape corresponding to at most half the outer peripheral edge of the sleeve 28. This for the purpose of minimizing deformation of the sleeve 28 occurring when it is press-fitted to the crankshaft connecting portion 24.

A clamp 26 connects to the crankshaft connecting portion 24 and retains the sleeve 28. Particularly, the clamp 26 is made of an elastically deformable metallic material and applies elastic force to the sleeve 28 so that it is continuously retained on the inner peripheral edge of the crankshaft connecting portion 24. As such, the clamp 26 has a similar role as that of a conventional leaf spring.

Figure 5:
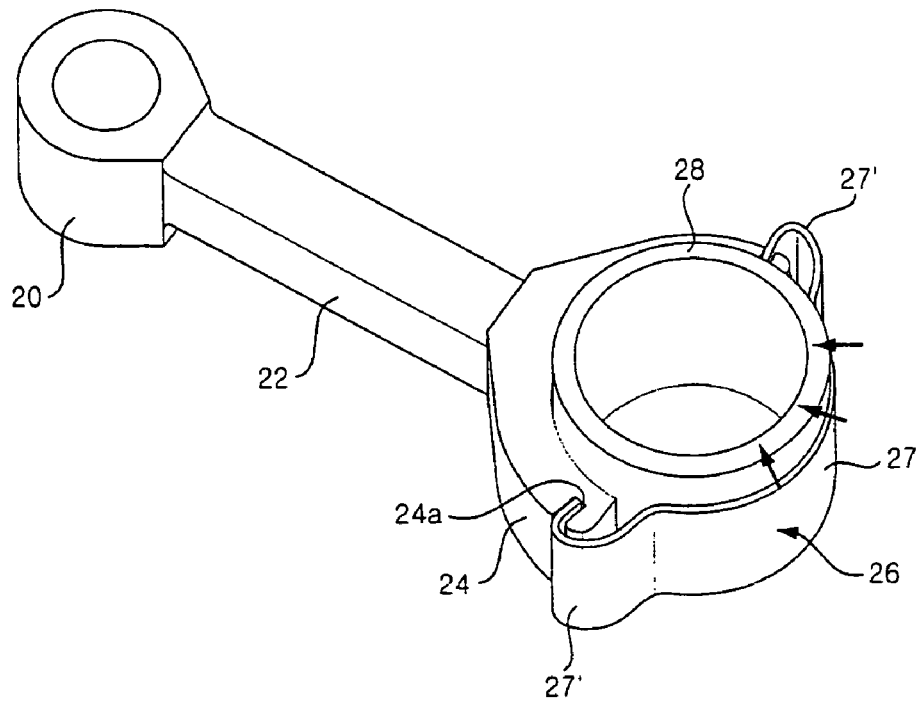
FIG. 5 is a perspective view showing a sleeve fixed to a connecting rod according to an embodiment of the present invention.

In order to fasten the clamp 26 to the crankshaft connecting portion 24, the crankshaft connecting portion 24 has grooves 24a formed on both ends thereof, respectively, in such a manner that they extend in the height direction while being indented with a predetermined depth. When both ends of the clamp 26 are inserted into the grooves 24a, respectively, the clamp 26 elastically deforms and supports the sleeve 28 while compressing it, as indicated by arrows in FIG. 5.

The shape of the clamp 26 will now be described in detail. The clamp 26 has an attachment portion 27 formed in a semi-circular shape, when viewed from above, with a predetermined curvature so that it attaches to the inner peripheral surface of the sleeve 28. The attachment portion 27 exerts elastic force in such a direction that it adheres to the inner peripheral surface of the sleeve 28.

The attachment portion 27 has latches 27' formed on both ends thereof, respectively. The latches 27' are bent in an approximately U-shaped configuration, when viewed from above, so that their front ends engage with the corresponding grooves 24a. Particularly, the front ends of the latches 27' extend from both ends of the attachment portion 27 towards each other, so that the latches 27' are latched on both ends of the crankshaft connecting portion 24.

Preferably, the connecting rod, which consists of the piston connecting portion 20, the body 22, and the crankshaft connecting portion 24, is integrally fabricated by sintering, and the sleeve 28 is made of aluminum. This is advantageous in that, compared with the case wherein the sleeve 28 is sintered, friction with the off-center pin 5b is reduced.

The assembly process of the connecting rod according to the present embodiment, which is constructed as mentioned above, will now be described. The sleeve 28 is brought into contact with the crankshaft connecting portion 24 of the connecting rod. Since the crankshaft connecting portion 24 spans from the point of connection to the body 22 to at most half the outer peripheral edge of the sleeve 28, when viewed from above, an outer surface of one side of the sleeve 28 can easily make contact with the inner peripheral surface of the crankshaft connecting portion 24 without additional force.

One of the latches 27' of the clamp 26 is fitted into one of the grooves 24a formed on one end of the crankshaft connecting portion 24. In order to fit the other latch 27' of the clamp 26 into the groove 24a formed on the other end of the crankshaft connecting portion 24, the clamp 26 is deformed elastically. In this state, the other latch 27' of the clamp 26 is latched on the other end of the crankshaft connecting portion 24. Then, the attachment portion 27 of the clamp 26 elastically attaches to the outer surface of the sleeve 28. The clamp 26 applies restoration force to one side of the outer peripheral surface of the sleeve 28 so that a part of the sleeve 28, which is opposite the attachment portion 27, is forced against the inner peripheral edge of the crankshaft connecting portion 24. As such, the sleeve 28 is supported and retained by the crankshaft connecting portion 24 and the clamp 26.

The assembly process is preferably performed after connecting the piston 7 to the piston connecting portion 20, positioning the crankshaft connecting portion 24 adjacent to the off-center pin 5b of the crankshaft 5, and inserting the off-center pin 5b into the sleeve 28.

When the compressor is actually driven after the assembly process, rotation of the crankshaft 5 causes the off-center pin 5b to rotate along a circular trajectory and the piston 7 to reciprocate linearly. The sleeve 28, which is fixed to the crankshaft connecting portion 24 of the connecting rod, rotates relative to the outer peripheral surface of the off-center pin 5b.

The clamp 26 is made of metal which can elastically deform to some degree. Particularly, the elastic modulus of the clamp 26 must be determined in such a manner that the resulting restoration force is equal to or larger than force exerted by the connecting rod, which causes the piston 7 to reciprocate linearly. This prevents the sleeve 28 from detaching from the crankshaft connecting portion 24, when the connecting rod causes the piston 7 to reciprocate linearly. As a result, the sleeve 28 hardly vibrates.

Figure 6:
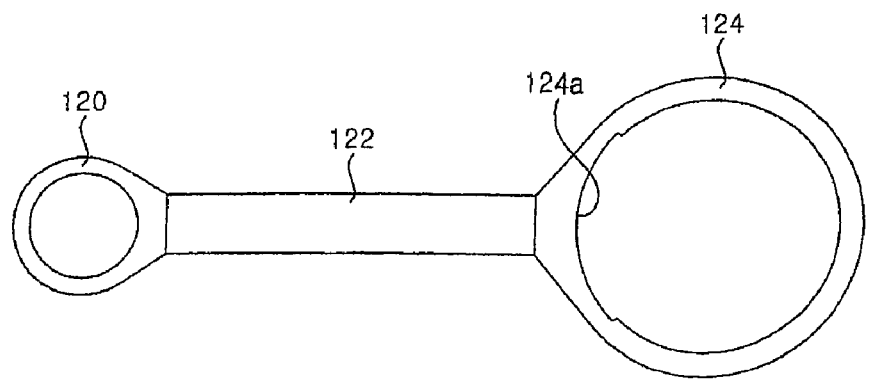
FIG. 6 is a top view showing a connecting rod according to another embodiment of the present invention.
Figure 7:
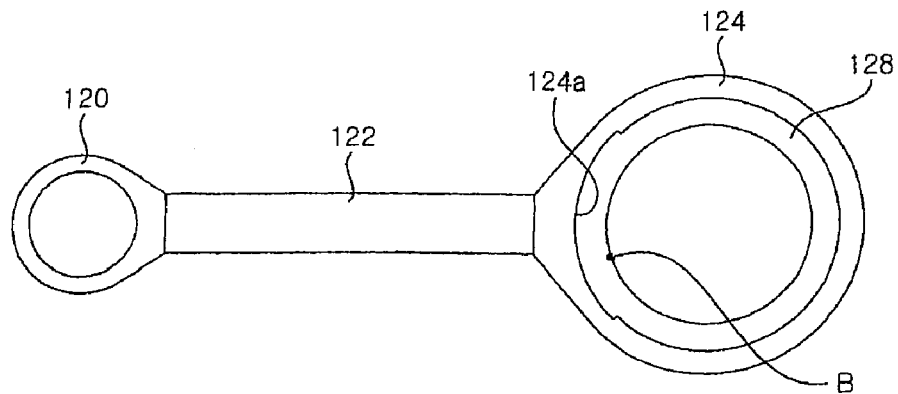
FIG. 7 is a top view showing a sleeve coupled to the connecting rod shown in FIG. 6.

The construction of a connecting rod according to another embodiment of the present invention will now be described with reference to FIGS. 6 to 8. Referring to the drawings, the connecting rod has a piston connecting portion 120 positioned on an end thereof. The piston connecting portion 120 connects to a piston 7 via a piston pin 7a in a chamber, which is formed inside the piston 7. Alternatively, the piston connecting portion 120 may connect to the piston 7 in a ball joint mode.

An end of a body 122 connects to the piston connecting portion 120. The body 122 has a bar shape with a predetermined section. The body 122 connects the piston connecting portion 120 to a crankshaft connecting portion 124.

The crankshaft connecting portion 124 is positioned on the other end of the body 122. The inner diameter of the crankshaft connecting portion 124 is determined in such a manner that a sleeve 128 can be press-fitted thereto. This is for the purpose of interlocking the sleeve 128 and the crankshaft connecting portion 124 as a single unit by pressing-fitting the sleeve 128 to the crankshaft connecting portion 124. When the sleeve 128 is fitted to an off-center pin 5b of a crankshaft 5 and the off-center pin 5b travels along a circular trajectory in accordance with rotation of the crankshaft 5, the sleeve 128 moves together with the crankshaft connecting portion 124 while rotating relative to the outer peripheral edge of the off-center pin 5b.

The crankshaft connecting portion 124 according to the present embodiment has a groove 124a formed on its inner peripheral edge. Due to the groove 124a, any deformation occurring when the sleeve 128 is press-fitted to the crankshaft connecting portion 124 is concentrated in the groove 124a, as shown in FIG. 7. This substantially prevents the sleeve 128 from varying its inner diameter.

The position of the groove 124a on the inner peripheral surface of the crankshaft connecting portion 124 corresponds to a point of coupling between the crankshaft connecting portion 124 and the body 122. This is for the purpose of directing any movement of inertia, which results from deformation of the sleeve 128, in the direction of force transmitted from the connecting rod, i.e. the longitudinal direction of the body 122. It can be easily understood by those skilled in the art that, when the inertia of the sleeve 128 is intentionally offset, the groove 124a may deflect from the direction of force transmitted from the connecting rod.

The depth of indentation and length of extension of the groove 124a are determined based on the degree of deformation of the sleeve 128. However, the depth and length of the groove 124a vary depending on specific conditions, including the material and thickness of the crankshaft connecting portion 124 and the sleeve 128. Considering this, the groove 124a preferably has a depth large enough to accommodate deformation of the sleeve 128, as long as the strength of the crankshaft connecting portion 124 is guaranteed.

Figure 8:
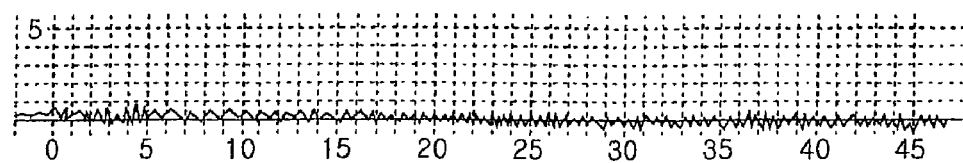
FIG. 8 is an enlarged view of part B of FIG. 7.

When the sleeve 128 is press-fitted into the groove 124a of the crankshaft connecting portion 124, the inner diameter of the sleeve 124 hardly varies, as shown in FIG. 8. More particularly, in FIG. 8, which has a scale of 1 micron, the straight solid line indicates enlarged part B of the sleeve 128, before being press-fitted, and the wavy solid line indicates enlarged part B of the sleeve 128, after being press-fitted.

It is clear from FIG. 8 that the straight solid line substantially overlaps the wavy solid line. This means that there is little deformation of the sleeve 128 before and after it is press-fitted. Therefore, by forming such a groove 124a on the crankshaft connecting portion 124 as in the present embodiment, the sleeve 128 retains its shape even when press-fitted. As a result, when an off-center pin 5b is inserted into the inner peripheral edge of the sleeve 128 and makes circumferential motion, the sleeve 128 makes uniform surface contact with the off-center pin 5b and transmits force to the connecting rod.

Figure 9:
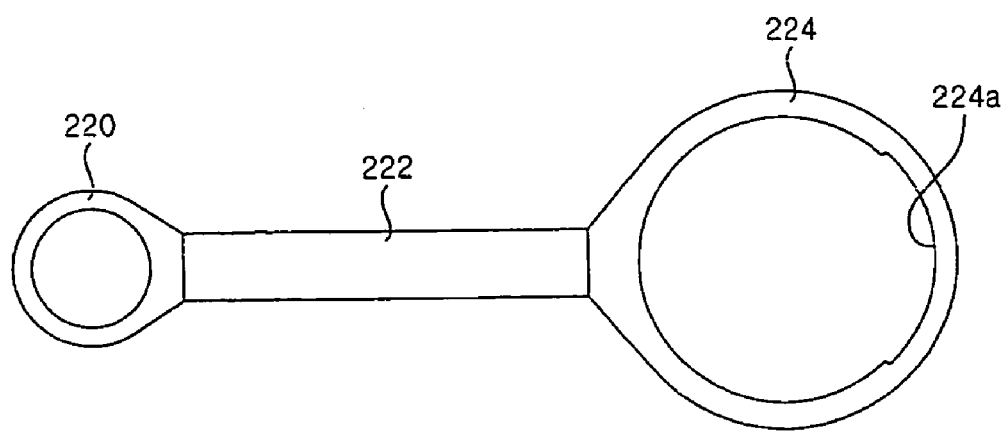
FIG. 9 is a top view showing a connecting rod according to another embodiment of the present invention.

FIG. 9 is a top view showing a connecting rod according to another embodiment of the present invention. The crankshaft connecting portion 224 of the connecting rod according to the present embodiment has a similar construction to that of the embodiment shown in FIG. 6, except for the position of the groove 224a. Particularly, the position of the groove 224a on the inner peripheral edge of the crankshaft 224 has an angular difference of 180° from the point of connection between the crankshaft connecting portion 224 and the body 222.

Such positioning of the groove 224a is for the purpose of directing any movement of inertia, which results from deformation of the sleeve, in the direction of force transmitted from the connecting rod, i.e. the longitudinal direction of the body 222, as in the above-mentioned embodiment. In the drawing, reference numeral 220 refers to the piston connecting portion.

As mentioned above, the connecting rod for a hermetic compressor according to the present invention is advantageous in that, since any deformation occurring when the sleeve is press-fitted to the crankshaft connecting portion of the connecting rod is concentrated in a predetermined position or absorbed by elastic deformation of the crankshaft connecting portion or the clamp, change in inner diameter of the sleeve is minimized.

The sleeve makes uniform surface contact with the off-center pin, which is inserted therein. This prevents the inner peripheral edge of the off-center pin from wearing down and improves the durability of the compressor.

In addition, minimized friction between the sleeve and the off-center pin increases the efficiency of force transmission from the crankshaft to the connecting rod and improves the compressor's performance.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A connecting rod for a hermetic compressor, comprising:
   a piston connecting portion;
   a body having an end connected to the piston connecting portion;
   a crankshaft connecting portion connected to a different end of the body and extending a predetermined length so that a curved surface is formed, an inner peripheral surface of the crankshaft connecting portion making surface contact with an outer peripheral surface of a continuous sleeve fitted to an off-center pin of a crankshaft; and a clamp fastened to both ends of the crankshaft connecting portion and exerting elastic force to retain the continuous sleeve on the inner peripheral surface of the crankshaft connecting portion, wherein the clamp comprises a substantially semi-circular attachment portion having a corresponding curvature that elastically attaches to the outer peripheral surface of the sleeve with latches formed on both ends thereof configured to engage with corresponding grooves formed on an outer surface of the crankshaft connecting portion.

2. The connecting rod as claimed in claim 1, wherein a range of extension of the crankshaft connecting portion corresponds to at most half an outer peripheral edge of the sleeve when viewed from above.

3. The connecting rod as claimed in claim 1, wherein the clamp is made of a metallic material.

4. The connecting rod as claimed in claim 3, wherein the crankshaft connecting portion extends from an end of the body in opposite directions so that the crankshaft connecting portion encloses at most half the outer peripheral surface of the sleeve.

5. The connecting rod as claimed in claim 4, wherein the grooves are formed on both ends of the crankshaft connecting portion, respectively, so that the latches formed on both ends of the clamp are inserted into and retained in the grooves.

6. The connecting rod as claimed in claim 1, wherein the piston connecting portion, the body, and the crankshaft connecting portion are integrally formed by sintering, and the sleeve is made of aluminum.

7. A hermetic compressor comprising the connecting rod of claim 1.

8. A connecting rod for a hermetic compressor, comprising:

a piston connecting portion;

a body having an end connected to the piston connecting portion; and a crankshaft connecting portion connected to a different end of the body, a sleeve being press-fitted to an inner peripheral surface of the crankshaft connecting portion so that the crankshaft connecting portion makes surface contact with an off-center pin of a crankshaft and rotates together with the sleeve while the sleeve is interposed, a groove being formed on the crankshaft connecting portion so that deformation of the sleeve is concentrated at a predetermined position and change of an inner diameter of the sleeve resulting from press-fitting is prevented, wherein the groove is formed on the inner peripheral surface of the crankshaft connecting portion at a position having an angular difference of ~180° from a point of connection between the crankshaft connecting portion and the body.

9. The connecting rod as claimed in claim 8, wherein the groove is indented from the inner peripheral surface of the crankshaft connecting portion a predetermined depth and extends a predetermined distance along the inner peripheral surface of the crankshaft connecting portion.

10. A hermetic compressor comprising the connecting rod of claim 8.

* * * * *